(No Model.)
M. H. KERNER.
HOLDER FOR POCKET UTENSILS.
No. 305,521. Patented Sept. 23, 1884.
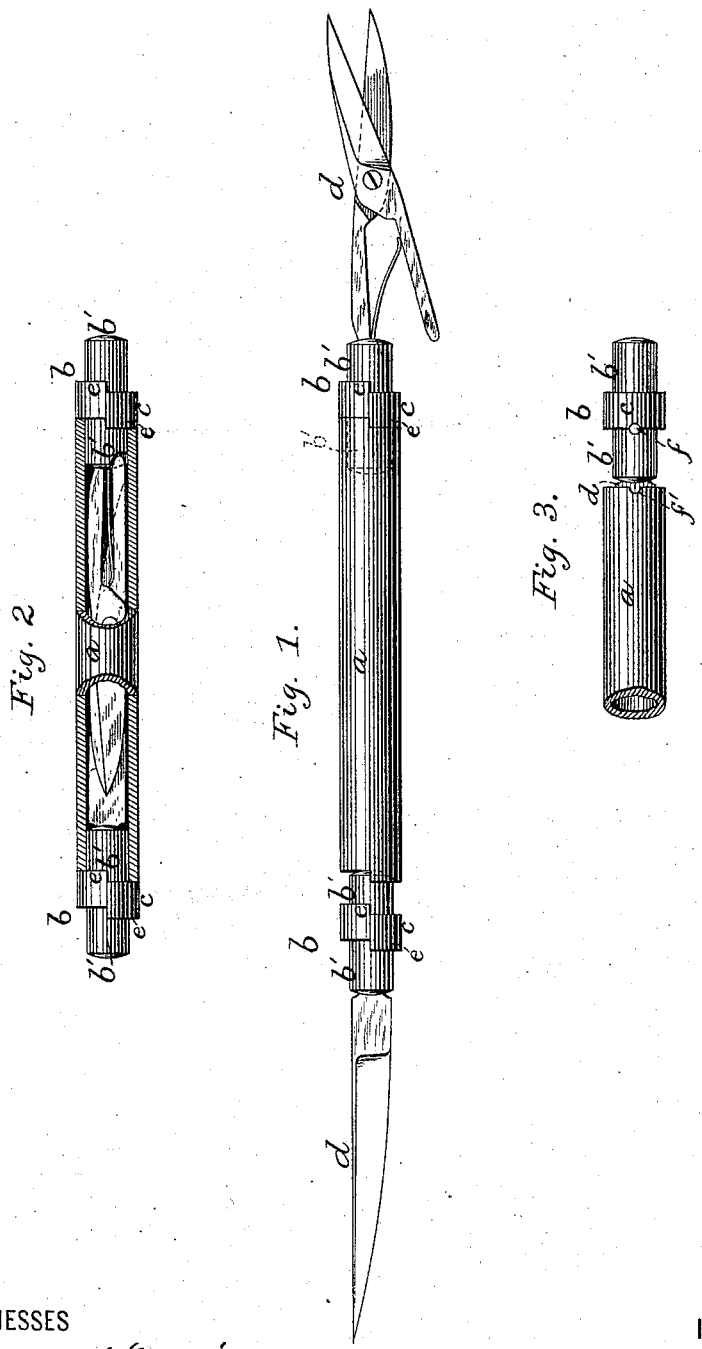
WITNESSES
A. Hamilton Morris.
Jno. N. Earl
INVENTOR
Marion H. Kerner
By his Attorney
Miller C. Earl

UNITED STATES PATENT OFFICE.

MARION H. KERNER, OF NEW YORK, N. Y.

HOLDER FOR POCKET UTENSILS.

SPECIFICATION forming part of Letters Patent No. 305,521, dated September 23, 1884.

Application filed January 15, 1884. (No model.)

*To all whom it may concern:*

Be it known that I, MARION H. KERNER, a citizen of the United States, and a resident of New York, in the county and State of New York, have invented certain new and useful Improvements in Holders for Pocket Utensils, of which the following is a specification.

My invention relates to pocket-utensil holders which consist of a barrel open at both ends, and provided with double-ended or reversible plugs fitting in the ends of the barrel, the utensils being attached to one end of the plugs, so as to be inclosed within or extended outward from the case for use, according to the position of the plugs.

The object and nature of my improvements lie in providing the plugs of holders of the above-described character with guides for directing the insertion of the plugs and utensils within the barrel, whereby the utensils may be inserted within the barrel from each of its ends without danger of such insertion being obstructed by the collision of the utensils, and the latter be made to pass and lie side by side within the holder.

In the accompanying drawings, Figure 1 is a horizontal view of a holder embodying one form of my improvements, and showing both utensils withdrawn from the interior of the holder. Fig. 2 is a similar view, being partly in section, and showing the utensils inclosed within the holder. Fig. 3 is a similar view of one end of the holder, illustrating the form of guides which I prefer to employ at each end of the holder.

Referring to Figs. 1 and 2, $a$ represents the barrel of the holder, it being open at both ends, and preferably cylindrical in form, and composed of vulcanized rubber or similar substance. $b\ b$ represent the double-ended or reversible plugs, which are also preferably formed from vulcanized rubber, and they comprise the two stems $b'\ b'$, separated by encircling-flanges $c$. The utensils $d$ (in the drawings represented as consisting of a knife-blade and a pair of pocket-scissors) are respectively attached to the outer ends of one of the stems $b'$ of the plugs $b$, as shown. The general manner in which either or both of the utensils $d$ are extended outward in position for use and inclosed within the holder is well understood, and is respectively shown in Figs. 1 and 2.

Referring now to Fig. 3, I provide the flanges $c$ of the plugs $b$ with guides, preferably consisting of a bead, $f$, of hard rubber or metal, formed upon or attached to the side of the flange $c$ of each plug, and extending in a radial direction across the flange from its periphery to the periphery of the stem. A notch or groove, $f'$, is formed across one side of the end of the holder $a$, within which notch the bead $f$ fits when the stem $b'$, carrying the utensil $d$, is fully inserted within the end of the holder. The beads $f$ should be affixed to each plug in definite relations to the plane across the sides of the utensils in which said utensils laterally lie, so that by maintaining the beads $f$ in line with the notches $f'$ during the insertion of the utensils within the holder, the said lateral plane of one utensil will correspond with that of the other, and their flat sides be laterally parallel to each other, and so that the planes of said sides will not cross, and the utensils may thus be allowed to pass side by side within the holder, as shown in Fig. 2. This definite relation of the guiding-beads $f$ with the lateral planes of the utensils may best consist in the bead being fixed at right angles to said planes, as will be understood upon reference to Fig. 3.

In Figs. 1 and 2 a modified form of guides is shown, and in this construction each end of the barrel $a$ is provided with a projecting head, $e$, extending half-way round the end of the holder. Both sides of the flanges $c$ of the plugs $b$ are also formed with heads $e$, which correspond with and are adapted to interlock with those on the ends of the holder, as shown. The sides of the flanges $c$ nearest their respective utensils may, however, be alone formed with the projecting heads, if desired, as the heads upon the opposite sides of the flanges are not necessary for guiding the insertion of the utensils within the holder, as will be readily understood. The point of intersection of the heads $e$ of the plugs with those of the holder should be arranged in a definite relation to the lateral plane of the utensils, so as to prevent the collision of the latter, in precisely the manner as has already been described in connection with Fig. 3.

The guides which have been described, in addition to guiding the eye in the insertion of the utensils, also act to lock the plugs against their rotation within the holder when the utensils are inclosed, and thus also prevent the collision of the utensils by the accidental turning of the plugs when fully attached to the holder, as will be readily understood.

In order to still further facilitate the insertion of the utensils $d$ $d$ within the holder without collision, it is sometimes preferable to unite the utensils to the plugs in such a manner that the longitudinal plane of the utensils will project slightly to one side of the axial line of the plugs, so that the utensils while being inclosed may be made to project in opposite directions slightly out of the line of the axes of the holder and plugs, and the extremities of the utensils thus be directed sidewise slightly away from each other.

What I claim herein as my invention is—

1. A holder for pocket utensils, consisting of a barrel having open ends fitted with reversible plugs carrying the utensils, said plugs being provided with guides for directing the insertion of the utensils within the barrel, and allowing them to pass and lie side by side therein, substantially as herein set forth.

2. The combination of the barrel $a$, having notch $f$ in its end, and the plug $b$, having flange $c$, and bead $f$, adapted to fit within said notch in the barrel, substantially as and for the purpose herein set forth.

Signed by me this 12th day of January, A. D. 1884.

MARION H. KERNER.

Witnesses:
WHATTON WAGSTAFF CRAIG,
MILLER C. EARL.